United States Patent
Stadtfeld et al.

(10) Patent No.: US 6,217,409 B1
(45) Date of Patent: Apr. 17, 2001

(54) THREADED GRINDING WHEEL AND METHOD OF DRESSING

(75) Inventors: Hermann J. Stadtfeld; Eric G. Mundt, both of Rochester, NY (US)

(73) Assignee: The Gleason Works, Rochester, NY (US)

( * ) Notice: Subject to any disclaimer, the term of this patent is extended or adjusted under 35 U.S.C. 154(b) by 0 days.

(21) Appl. No.: 09/267,733

(22) Filed: Mar. 15, 1999

Related U.S. Application Data

(60) Provisional application No. 60/078,385, filed on Mar. 18, 1998.

(51) Int. Cl.[7] ................................................. B24B 49/00
(52) U.S. Cl. ................................ 451/5; 451/47; 451/56; 451/147; 451/161; 451/900
(58) Field of Search ................................ 451/5, 47, 147, 451/161, 219, 253, 275, 900, 56

(56) References Cited

U.S. PATENT DOCUMENTS

| | | |
|---|---|---|
| 4,174,914 | 11/1979 | Ainoura . |
| 4,850,155 | 7/1989 | Sulzer . |
| 4,947,590 * | 8/1990 | Schapp et al. ........................... 451/47 |
| 5,573,449 | 11/1996 | Mackowsky . |
| 5,645,467 * | 7/1997 | Schriefer ................................. 451/47 |
| 5,647,790 * | 7/1997 | Horiutchi et al. ....................... 451/47 |
| 5,720,584 * | 2/1998 | Sijtstra .................................... 451/47 |
| 5,823,857 * | 10/1998 | Tan .......................................... 451/47 |
| 5,957,762 * | 9/1999 | Schriefer ............................... 451/147 |

FOREIGN PATENT DOCUMENTS

| | | |
|---|---|---|
| 3829604 | 3/1990 | (DE) . |
| 2070927 | 9/1971 | (FR) . |
| 1537877 | 1/1979 | (GB) . |

OTHER PUBLICATIONS

Schriefer, Herbert, "Continuous CNC Gear Grinding", The Gleason Works, Rochester, New York, Mar., 1996.

* cited by examiner

*Primary Examiner*—M. Rachuba
(74) *Attorney, Agent, or Firm*—Robert L. McDowell

(57) ABSTRACT

A method of dressing a threaded grinding wheel such that twisting of workpiece tooth flanks does not occur during grinding. The grinding wheel is preferably dressed with a circular arc hollow-crowned generating front with the generating front being described by a radius, $R_b$, and dressed into an axial plane of the grinding wheel. The workpiece is then relatively shifted across the grinding wheel along a feed shift vector which is oriented perpendicular to the axis of the workpiece. With this method, the effects of flank twist can be eliminated, or, a controlled amount of flank twist can be introduced not only in helical gears, but also in spur gears. The grinding wheel may also be dressed with a circular arc barrel-shaped generating front. The principles of the present invention may also be applied to hobbing tools.

11 Claims, 8 Drawing Sheets

THREADED GRINDING WHEEL AND METHOD OF DRESSING

This application claims benefit of Provisional No. 60/078,385, filed Mar. 18, 1998.

FIELD OF THE INVENTION

The present invention is directed to tools, such as threaded grinding wheels and hobs, for manufacturing spur and helical gears, and to methods of producing such tools and methods of manufacturing spur and helical gears utilizing such tools to control flank twist on the gears.

BACKGROUND OF THE INVENTION

It is well known to grind spur and helical gears with threaded grinding wheels to produce crowned tooth surfaces in the lengthwise (longitudinal) direction. Crowning in such a manner relieves end loading by effectively moving the area of contact away from the tooth ends and toward the center of the tooth.

On a threaded wheel grinding machine, the conventional method used to produce lengthwise crowning on spur gears involves changing the relative distance between the gear and grinding wheel axes as the grinding wheel moves over the gear face, (stroke motion). This relative distance is reduced near the ends of the gear face, thus thinning the gear teeth as more stock material is removed at the tooth ends. As the grinding wheel moves inward from the tooth ends, the relative distance between the gear and grinding wheel is increased to remove less stock material and provide the desired tooth thickness at or near the mid-face position, where the gear tooth flanks are normally expected to contact the mating member.

The conventional method of producing lengthwise crowning is generally effective for gears where the axial arrangement between workpiece and tool is close to 90 degrees, i.e. for spur and low helix angle gears. However, this method produces potentially detrimental flank form distortions on helical gears which require a crossed axis angle deviating significantly from 90 degrees. The flank distortions are caused by uneven stock removal, which progressively alters the pressure angle of the tooth flanks along the tooth length, and is most severe at the tooth ends. The tooth flanks appear to be twisted in the lengthwise direction, and thus the condition is known as "flank twist." It is well known that the magnitude of the flank twist becomes more pronounced with increasing helix angle, increasing lengthwise crowning, and decreasing pressure angle, among other factors.

Most spur and helical gears are inspected for profile (involute) form errors only at one location in the tooth lengthwise direction, which usually corresponds to the mid face position. Lead (longitudinal) form errors are typically checked only at one profile height, which normally corresponds to the pitch cylinder. Flank twist errors cannot be determined from inspection data collected in this manner. Thus, although flank twist is generally well known in theory, it is frequently ignored or remains undetected in practice. However, on helical gears with crowning, the flank twist effect can be significant, and may adversely affect one or more of the following characteristics: backlash, motion transmission error, noise, or strength. Conversely, it may be desirable to produce flank twist to improve or modify any of the aforementioned characteristics on spur gears or on helical gears with no lengthwise crowning, where flank twist effects would otherwise be small.

One method for addressing flank twist is disclosed in U.S. Pat. No. 4,850,155 to Sulzer. In this method, the pressure angle and tooth thickness of the tool change continuously from one end of the tool toward the other. The motion of the tool with respect to the workpiece is axial and tangential, which results in a diagonal feeding of the workpiece across the tool. As the tool is fed along the gear face, it is moved tangentially so as to expose the workpiece to the portion of the tool with the pressure angle modification required to correct flank twist errors. Tooth thickness changes along the tool length serve in a similar manner to produce the desired lengthwise crowning, which may occur in concert with the earlier explained machine motions normally used to effect crowning. For clarity, FIG. 1 compares the conventional generating rack with that of the Sulzer method and illustrates the pressure angle change along the length of the generating tool according to Sulzer. FIG. 2 shows an enlargement of the same for two teeth at either end of the tool.

Although capable of producing tooth twist modification, the Sulzer method has significant practical limitations. In the case of a threaded grinding machine with conventional wheel dressing mechanism, it is not practical (and in most cases not possible) to dress a wheel with continuously changing pressure angle. In the case of gear hobbing, the hob profile grinding operation becomes excessively complex.

Another method of alleviating the distortions of flank twisting is disclosed by Schriefer in "Continuous CNC Gear Grinding", The Gleason Works, March 1996. In this disclosure, it is suggested that the tooth trace produced by a threaded grinding wheel passing over the face of a helical workpiece becomes distorted because the straight generation front of the tool lies at an angle to the workpiece axis. With this arrangement, the actual crown envelope surface is distorted with respect to the desired crown envelope surface, thus producing tooth flank deviations. Schriefer proposes providing an elliptically crowned grinding wheel to negate the effects of flank twisting. The elliptical shape results from passing an axial crossing plane through a cylinder representing the desired circular lead crowning of the tooth surfaces of the workpiece.

The method proposed by Schriefer also has significant practical limitations. Although an elliptical shape could be produced on a threaded grinding wheel using modern CNC dressing mechanisms, the continuously changing curvature of the ellipse is very sensitive to relative positioning errors between the dresser and wheel. For the same reason, the process is also excessively sensitive to positioning errors between the wheel and workpiece during grinding. It is furthermore not straightforward to use a tool with given elliptical shape for different tooth twist modification amounts. This represents a limitation primarily for non-dressable wheels or hobbing tools, where a physically different tool would be required for different flank twist modifications on a given workpiece. Besides these limitations, Schriefer does not disclose the relationship between the tool width, machine motions, and elliptical shape of the generating front, which would be central to a flank twist modification technique.

SUMMARY OF THE INVENTION

The present invention is directed to a method of dressing a threaded grinding wheel such that twisting of workpiece tooth flanks can be controlled during grinding. The grinding wheel is dressed with a circular arc generating front without changing pressure angle or size of the teeth over the length of the tool. The circular arc radius, which is dressed into an axial plane of the grinding wheel, may be positive (hollow crown wheel) or negative (barrel crown wheel). The circular arc radius of the tool and diagonal shift amount used during grinding may be adjusted to eliminate some or all of the naturally occurring flank twist, or to introduce a controlled amount of flank twist. The method may be applied to spur or helical gears, with or without lengthwise crowning. The principles of the present invention may also be applied to hobbing tools.

DETAILED DESCRIPTION OF THE PREFERRED EMBODIMENT

The present invention will now be discussed in detail with reference to the accompanying drawings.

The present inventive method may be carried out on any machine tool capable of adjusting the relative rotational position between a dressing tool and a grinding wheel, and between the grinding wheel and a workpiece in response to information provided by a computing means such as a computer numerical control.

Figure 1:
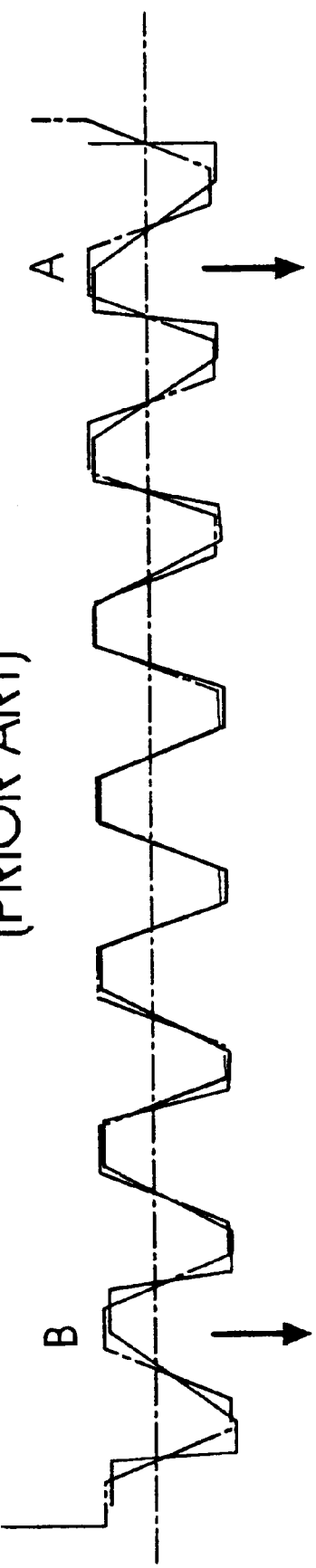
FIG. 1 illustrates a prior art grinding wheel for eliminating flank twist in which the flank surface pressure angles vary along the length of the grinding wheel.
Figure 2:
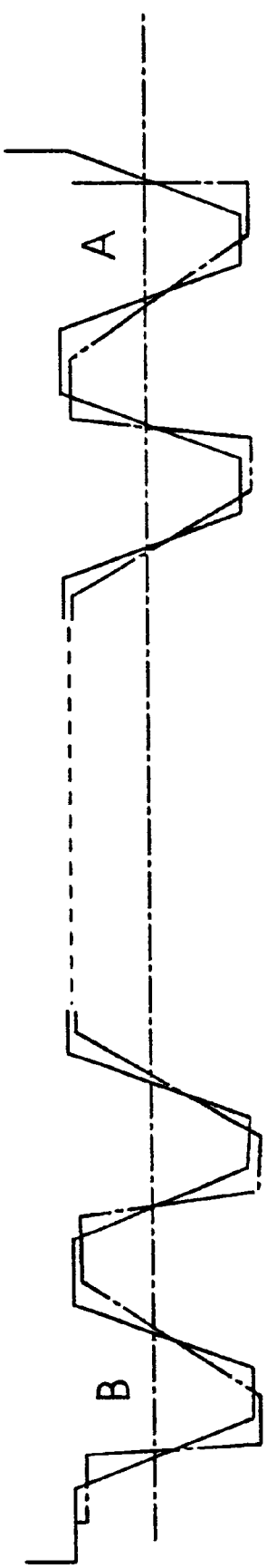
FIG. 2 is an enlarged view of two teeth on each end of the grinding wheel of FIG. 1.
Figure 3:
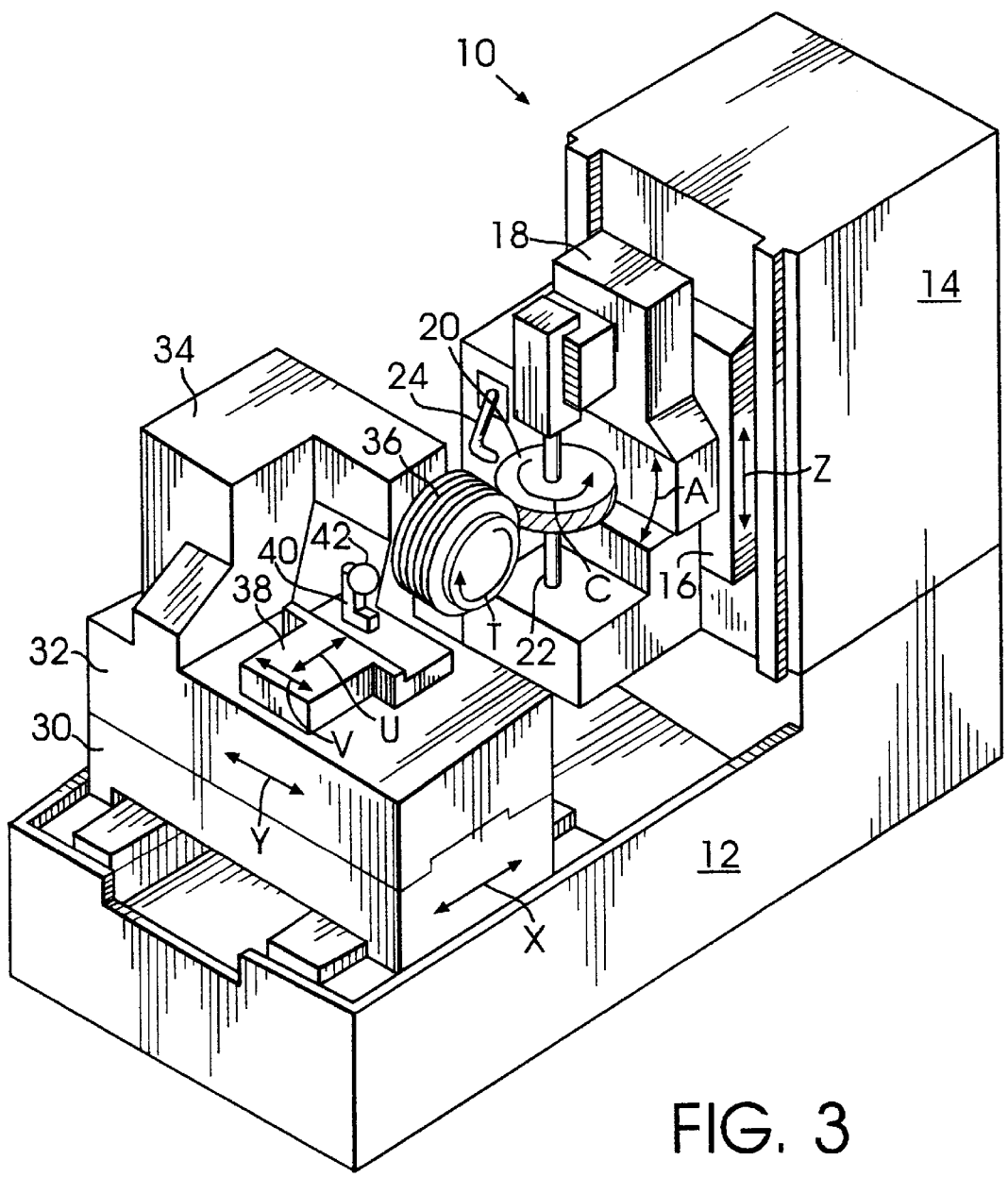
FIG. 3 schematically illustrates a computer controlled grinding machine on which the inventive method can be carried out.

FIG. 3 schematically illustrates one type of machine tool as set forth above comprising a computer controlled machine 10 for grinding spur and helical gears with a threaded grinding wheel. Machines of this type are known in the art and are readily available.

The machine includes a base 12 and a work column 14. A work table slide 16 is arranged on the work column 14 for linear movement along an axis (Z-axis). Mounted for rotation to work table slide 16 is work support 18 which is rotatable about an axis (A-axis) for setting the proper helix angle required for grinding a particular gear. A work gear 20 is mounted to a rotatable spindle 22 by appropriate work holding equipment for rotation about the work gear axis (C-axis). Also shown is non-contact probe 24 positioned adjacent the tooth surfaces of workpiece 20. Non-contacting probes are well known using electric or magnetic fields, air jets, or light beams to generate trigger signals whenever the flank of a workpiece passes within some predetermined distance from the probe.

Also located on base 12 are a pair of tool slides 30 and 32. Tool slide 30 enables movement of the tool along the length of the base (X-axis) and tool slide 32 enables movement of the tool across the width of the base (Y-axis). Machine axes X, Y, and Z are mutually perpendicular to one another. Attached to tool slide 32 is tool support 34 to which tool 36 is mounted for rotation about a tool axis (T-axis).

A dressing wheel table 38 is located on tool slide 32 and is movable along perpendicular dressing axes (U-axis and V-axis). A dressing tool support 40 is mounted to dressing wheel table 38 and a rotary dressing tool 42 is mounted for rotation to dressing tool support 40. Dressing tool support 40 is angularly adjustable on table 38 in order to position the dressing tool 42 to the lead angle of the grinding wheel 36. V-axis motion is utilized to traverse the dressing tool 42 along the width of the grinding wheel 36 and U-axis motion is used for infeeding of the dressing tool to position the dressing tool 42 at contact points along the profile of the grinding thread surface.

Movement about or along the described axes is imparted by separate drive motors (not shown). The movable machine components named above are capable of independent movement with respect to one another and may move simultaneously with one another. Each of the respective motors is associated with either a linear or rotary encoder (not shown) as part of a computer numerical control (CNC) system which governs the operation of the drive motors in accordance with instructions input to a computer (not shown). The encoders provide feedback information to the computer concerning the actual positions of each of the movable axes.

Figure 4:
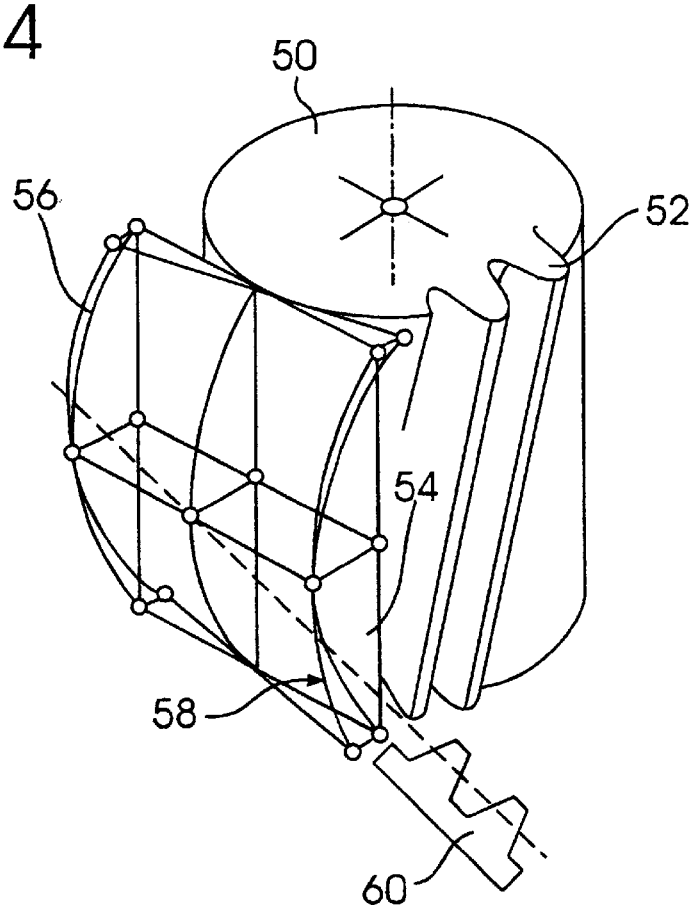
FIG. 4 illustrates a portion of a crowning cylinder for a helical gear and shows the effects of flank twist on the tooth surfaces.

FIGS. 4 and 5 illustrate flank twisting. A helical gear 50 is shown having teeth 52, only two of which are illustrated. A reference plane is shown at 54, whose length is the same as the face width of the gear and whose width corresponds to the profile generation length. The desired lengthwise tooth crowning may be represented by circular arcs 56 which, taken together, define a nominal crown envelope surface. This surface is swept out by a line tangent to the gear at a reference contact point between gear and tool as the tool is moved axially over the gear face width and the relative distance between gear and tool axes is varied to obtain the desired crowning. The crown envelope surface is thus directly related to the crowning produced on the tooth flanks when viewed in the conventional tangential or normal planes.

Lengthwise crowning produced according to the nominal crown envelope surface 56 would have no associated tooth twist distortions. However, the straight rack generating front of the grinding wheel 60, which is inclined to the workpiece axis, produces lengthwise crowning according to the actual crown envelope surface indicated by lines 58. The actual crown surface 58 is clearly not aligned with the desired surface 56, but is instead effectively twisted with reference to desired crowning 56. This, in turn, causes the tooth flank twisting. The same concept applies in cases where the crowning is not purely circular, but instead is defined according to a higher order polynomial, for example.

Figure 5A:
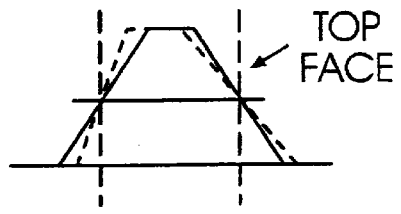
FIGS. 5a, 5b and 5c show flank twist at the top, center and bottom, respectively, of a helical gear tooth.
Figure 5B:
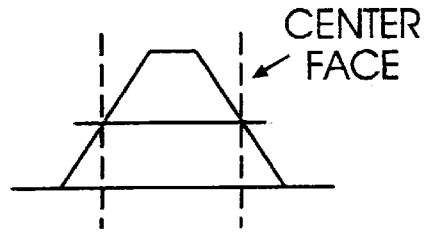
Figure 5C:
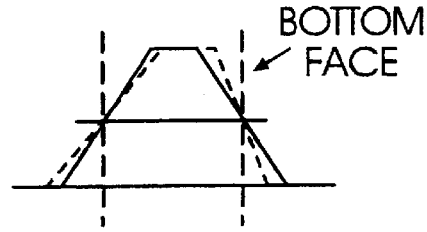

FIGS. 5(a) and 5(c) show the tooth twist in terms of pressure angle error at the top and bottom face positions of gear 50. At the top face of the gear (FIG. 5a), the distortion of the actual crown envelope surface causes uneven stock removal along the tooth profile, such that there is a negative pressure angle error on the left flank and positive pressure angle error on the right flank. At the bottom face position (FIG. 5c), the uneven stock removal effect is reversed such that there are positive and negative pressure angle errors on the left and right tooth flanks, respectively. The tooth twist errors come to a maximum at the extremities of the tooth length, while at the center of the gear face (FIG. 5b), tooth profile geometry errors due to distortion of the actual crown envelope surface are negligible.

As explained above, the actual crown envelope surface is distorted relative to the nominal crown envelope surface when lengthwise crowning is produced on a helical gear with a straight rack generating front. Quantification of the resulting tooth twist errors thus follows from analysis of the amount of crown envelope distortion. A close approximation of the maximum amount of natural twist introduced by circular crowning with a straight rack grinding profile is given by the following relationship:

$$\Delta\alpha_n = \frac{b}{2r}\sin\beta \qquad (1)$$

where $\Delta\alpha_n$=normal pressure angle error at the tooth ends
b=face width of workpiece
r=workpiece crown envelope radius
$\beta$=helix angle For purposes of this discussion, tooth twist is expressed as above in terms of pressure angle error at the tooth ends. It is duly noted that the same errors may be expressed alternatively, for example, by total pressure angle variation along the tooth length (i.e. $2*\Delta\alpha_n$), or by total lead angle variation along the tooth profile height (typically denoted by $\Delta\nu_\beta$). However, no industry wide convention exists.

The present invention introduces a method to control flank twisting by dressing a threaded grinding wheel to produce a crowned wheel shape, such as a circular arc hollow-crowned grinding wheel, which will be referred to hereafter.

Figure 6:
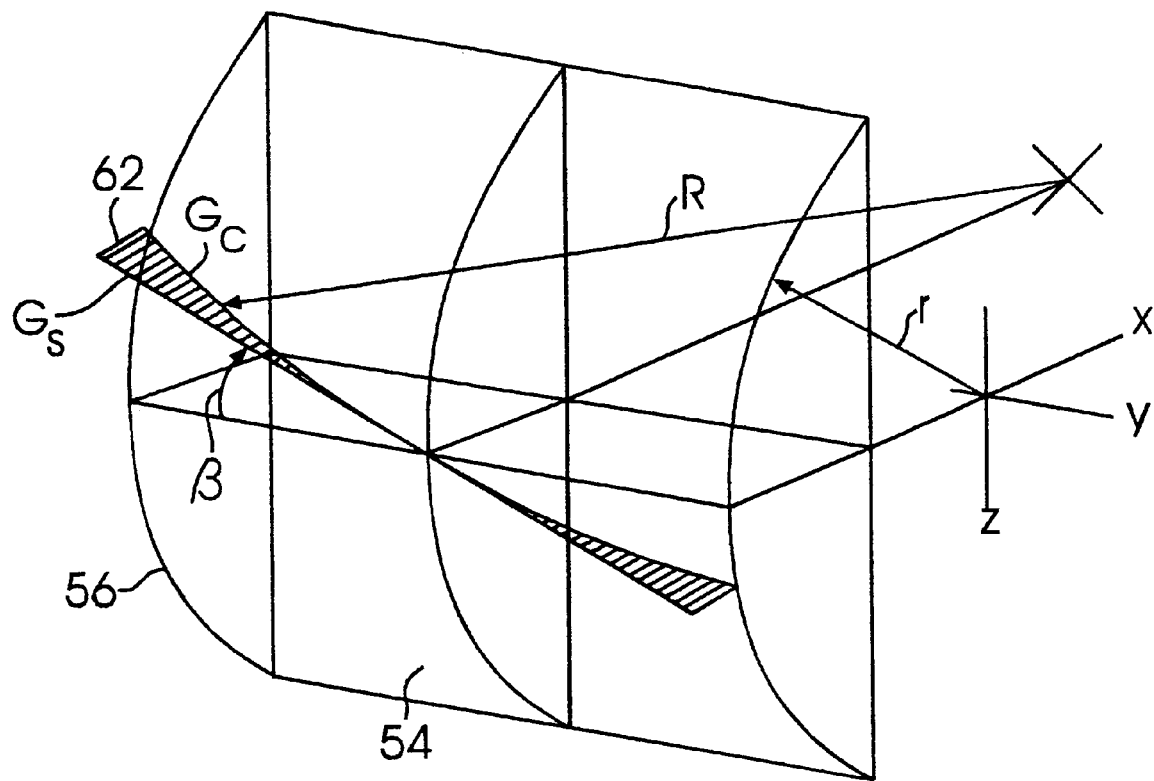
FIG. 6 shows a straight rack generating front and a curved generating front and their relationship to the crown envelope cylinder.

In FIG. 6, the crown envelope surface 56 of a workpiece is shown having a radius r. For a workpiece that is moved axially in front of a grinding wheel, the straight rack generating front, $G_S$, is shown oriented perpendicular to the helix angle $\beta$ of the gear at the mid face position. The curved line $G_C$ results from the intersection of the crown envelope surface and a plane which passes through $G_S$ perpendicular to the gear axis. It can be seen at the ends of the crown envelope cylinder 56 that a gap 62 exists between the position of the straight rack generating front $G_S$ and the curved line $G_C$. This gap 62, which varies along the gear face, represents the crown envelope surface distortion that causes flank twisting.

As previously mentioned, Schriefer suggests orienting a plane in the shifting direction and passing the plane through the crown envelope cylinder. The intersection of the plane with the cylinder forms an ellipse, and it is suggested that this ellipse could outline the shape of the generating front of a tool which would grind a helical gear without flank twisting. However, the elliptical shape presents several disadvantages or limitations with regards to process sensitivity and practical implementation. Furthermore, the critical relationship between the tool width, machine stroke and shift motions, and elliptical shape of the generating front are not disclosed. In the absence of this relationship, tooth twist compensation or modification is not possible.

The inventors have discovered that the above discussed disadvantages with respect to an elliptically shaped grinding wheel can be averted by instead describing the generating front $G_C$ with a circular arc. The radius R of the circular arc depends on the basic gear geometry as well as the desired amount of twist correction and the desired length of the tool to be used for grinding. In general terms, this relationship may be expressed as:

$$R=f(\Delta\alpha_{comp},\Delta W) \qquad (2)$$

where R=radius of generating front $G_C$
$\Delta\alpha_{comp}$=desired normal pressure angle correction at the tooth ends
$\Delta W$=desired total wheel shift amount The specific form of the above equation depends on the kinematic arrangement of a given machine tool. In the following, the equation for the circular arc radius of the generating front is developed for the example of a threaded wheel grinding machine according to FIG. 3. In this example, the stroke motion is implemented by a vertical slide (Z-axis) on the workhead column, the swivel mechanism is built onto the vertical slide, and the wheel thread is normally right hand ($\lambda$ positive). Other variations of the formula result for other machine configurations, where, for instance, the stroke axis (Z-axis) is built onto the swivel mechanism and is therefore not always vertical, or the swivel mechanism is located on the tool side of the machine.

Figure 7:
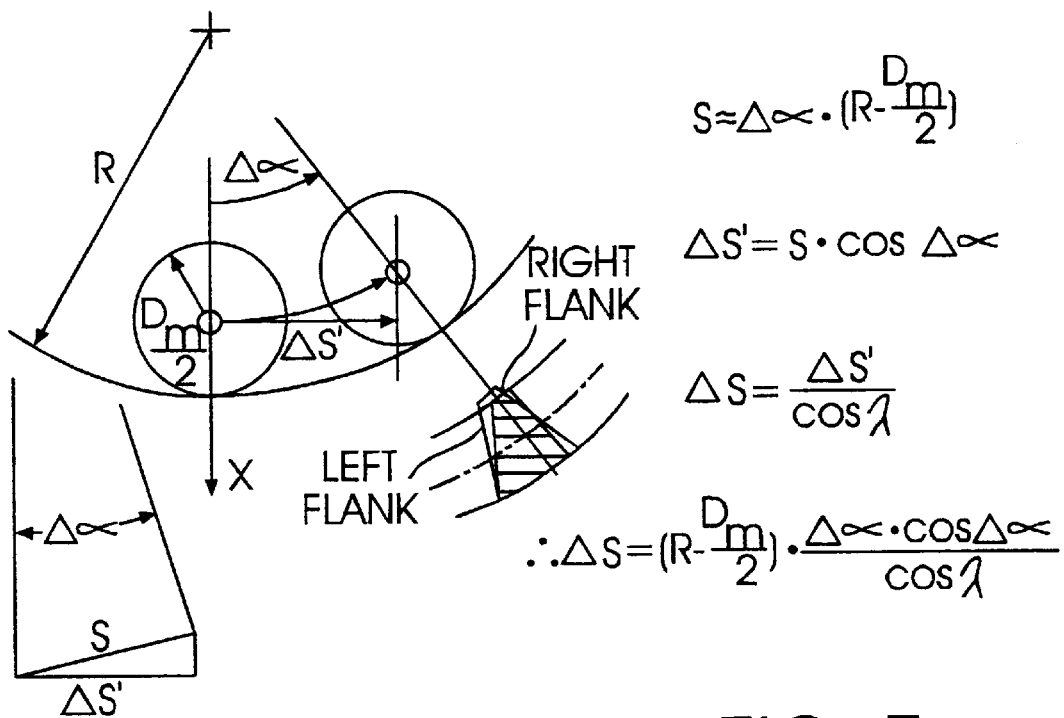
FIG. 7 illustrates the relationship between the inventive circular arc grinding wheel radius and the shift amount for tooth twist correction.
Figure 8:
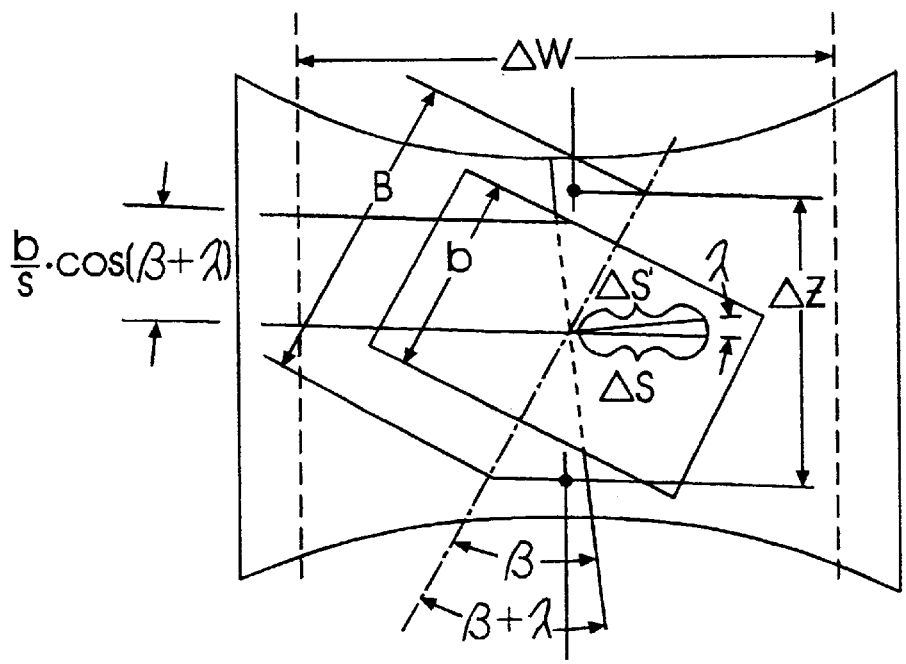
FIG. 8 illustrates the relationship between shift amount, vertical travel for grinding and tool width.

FIG. 7 shows the relationship between the circular arc radius of the inventive generating front and the shift amount required to obtain a desired magnitude of tooth twist correction (pressure angle correction at the extremities of the tooth length). Wheel shift during grinding is required in order to expose each portion of the gear tooth length to the appropriate section of the curved generating front. FIG. 7 is drawn in the plane of the generating contact line, i.e. a plane perpendicular to the helix angle of the gear. In the machine, this plane is tilted by the wheel lead angle $\lambda$ from the horizontal (X-Y) plane. $\Delta S$ is the basic shift amount which relates to contact between the respective pitch cylinders of the gear and tool along half of the gear face width. The wheel shift axis in this example is parallel to the Y-axis of the machine. As shown in the FIGURE, the wheel shift amount corresponding to the circular arc radius of the generating front and the desired twist correction is as follows:

$$\Delta S = \left[R - \frac{D_m}{2}\right] * \frac{\Delta\alpha_{comp} * \cos(\Delta\alpha_{comp})}{\cos(\lambda)} \qquad (3)$$

where $\Delta S$=basic wheel shift amount
$\Delta\alpha_{comp}$=desired normal pressure angle correction
$\lambda$=wheel lead angle
$D_m$=workpiece pitch diameter The basic shift travel $\Delta S$ corresponds to grinding half of the gear tooth length, i.e. from the center face to one end of the gear face width. With reference to FIG. 8, considering that the total stroke travel used to grind a gear includes extra stroke travel to properly allow for stock allowance, entry and exit of the wheel threads into the grinding zone, generating mesh contact length, etc., and that the desired amount of wheel shift generally depends on the useful width of the tool, the following relationship becomes valid:

$$\frac{\Delta W}{B} = \frac{2 * \Delta S}{b} \quad (4)$$

where ΔW=desired total wheel shift amount
B=total stroke travel in the workpiece axis direction
ΔS=basic wheel shift amount
b=face width of workpiece Combining with the previous equation (3) and solving for R thus yields:

$$R = \frac{\Delta W * b * \cos(\lambda)}{2 * B * \Delta \alpha_{comp} * \cos(\Delta \alpha_{comp})} + \frac{D_m}{2} \quad (5)$$

Figure 9:
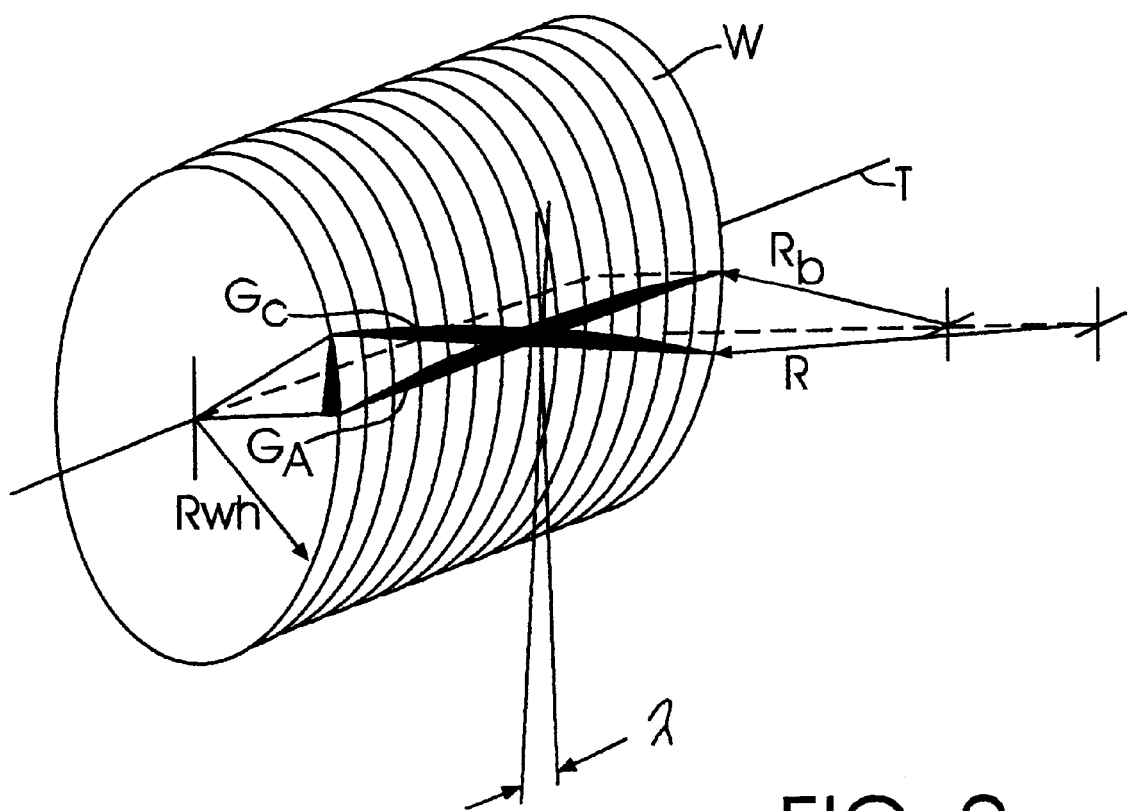
FIG. 9 illustrates a curved generating front on a grinding wheel and the inventive axially positioned curved generating front.

Knowing the radius R of the generating front $G_C$, a corresponding circular arc generating front, $G_A$, (FIG. 9) is established in the direction of the grinding wheel axis T, i.e. in the axial plane of the grinding wheel. Although there are other possible approximations, use of the known Baxter curvature equation yields the following result for the radius of $G_A$.

$$R_b = \frac{R * R_{wh} * \cos^2 \lambda}{R_{wh} + R * \cos^2(90 - \lambda)} \quad (6)$$

where $R_b$=radius of axial plane generating front, $G_A$
R=radius of generating front $G_C$
$R_{wh}$=grinding wheel radius
λ=grinding wheel lead angle Other possible approximations, for instance, could include $R_b \approx R * \cos^2 \lambda$ or $R_b \approx R$, either of which may be reasonable for small λ, as is generally the case for grinding machines with dressable threaded wheels.

Figure 10:
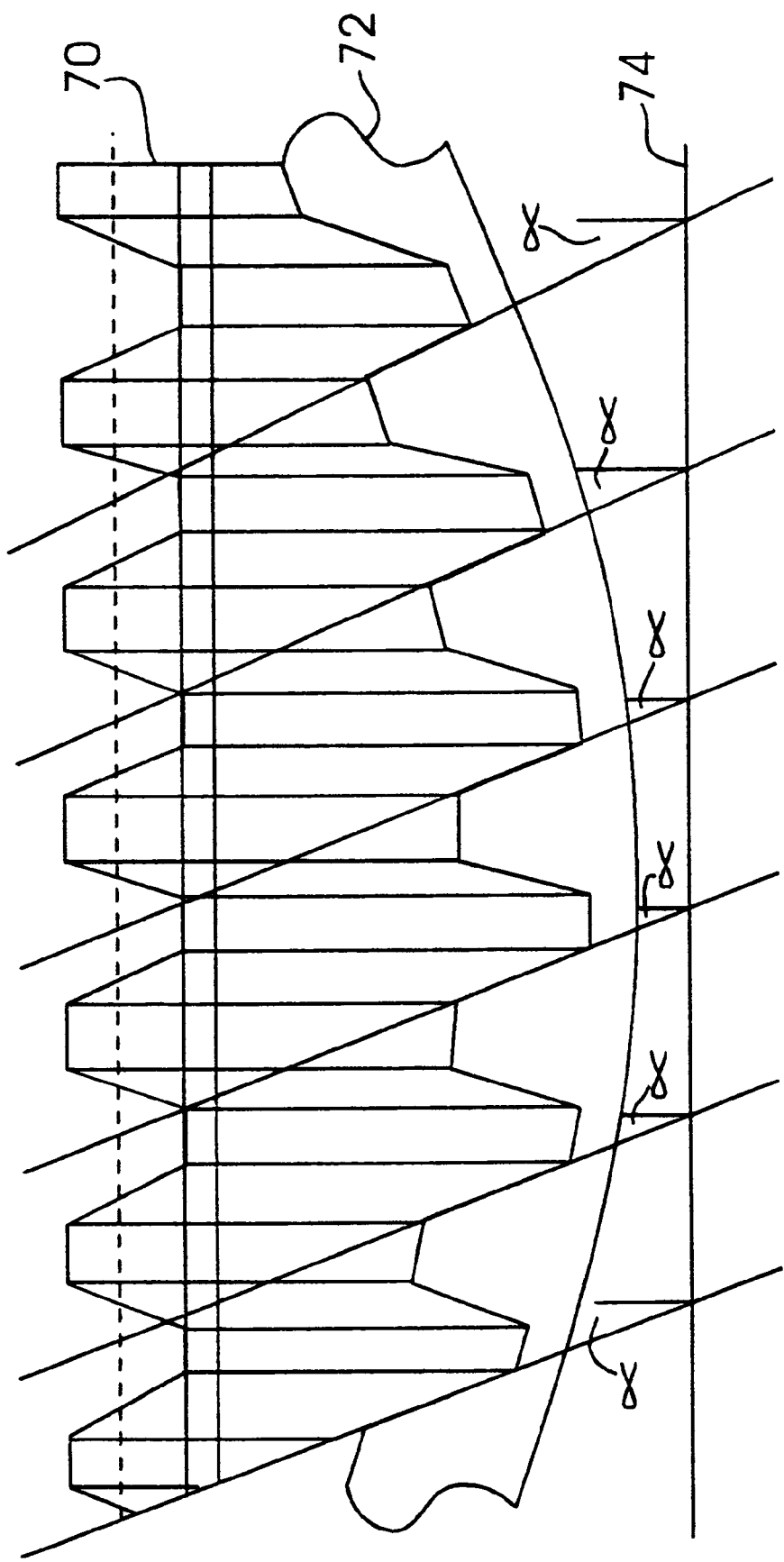
FIG. 10 illustrates the constant pressure angles of the flanks of the inventive grinding wheel.

Once $R_b$ is established, the grinding wheel can be dressed in the axial direction in accordance with radius $R_b$ thus producing a circular arc hollow crowned grinding wheel having a constant thread size, with respect to the thickness at the pitch point, and a constant pressure angle on each flank along the entire wheel length such as shown in FIG. 10, for example. FIG. 10 is an axial section of a tool showing the circular arc hollow crowned generating front 72 with threads having constant pressure angle α relative to a line 74, which is parallel to the nominal pitch line of the tool. A straight rack tool 70 is illustrated for comparison purposes.

As stated above with regard to dressing the grinding wheel, the grinding wheel is dressed in the axial direction in accordance with radius $R_b$ thus producing a circular arc hollow crowned grinding wheel having a constant thread size and a constant pressure angle on each flank along the entire wheel length. The dressing tool may be any tool capable of forming the desired pressure angle on each flank of the grinding thread. The flanks of the dressing tool may have the same pressure angles or the respective flank pressure angles may differ from one another. For example, the dressing tool may be selected from: (1) dual independent dressing discs which dress opposite flanks of a grinding thread, (2) a single dressing disc which dresses adjacent sides of successive threads, or, (3) a straddle dressing disc which dresses opposite flanks of a grinding thread. In any case, the dressing disc is positioned such that its pressure angle complements the desired pressure angle of the grinding thread flanks. The dressing tool is then traversed in an axial plane across the grinding wheel in accordance with radius $R_b$.

The tool geometry alone, however, is not sufficient to allow control of tooth flank twisting. The diagonal feed vector must be known to properly coordinate tool shift motion (Y-axis) with the stroke motion (Z-axis) of the tool over the gear face. Additionally, the relative distance between the workpiece and grinding wheel (X-axis) must be adjusted during the stroke feed motion (Z-axis) to account for the curvature in the grinding wheel, such that the desired lengthwise crowning is achieved.

Figure 11:
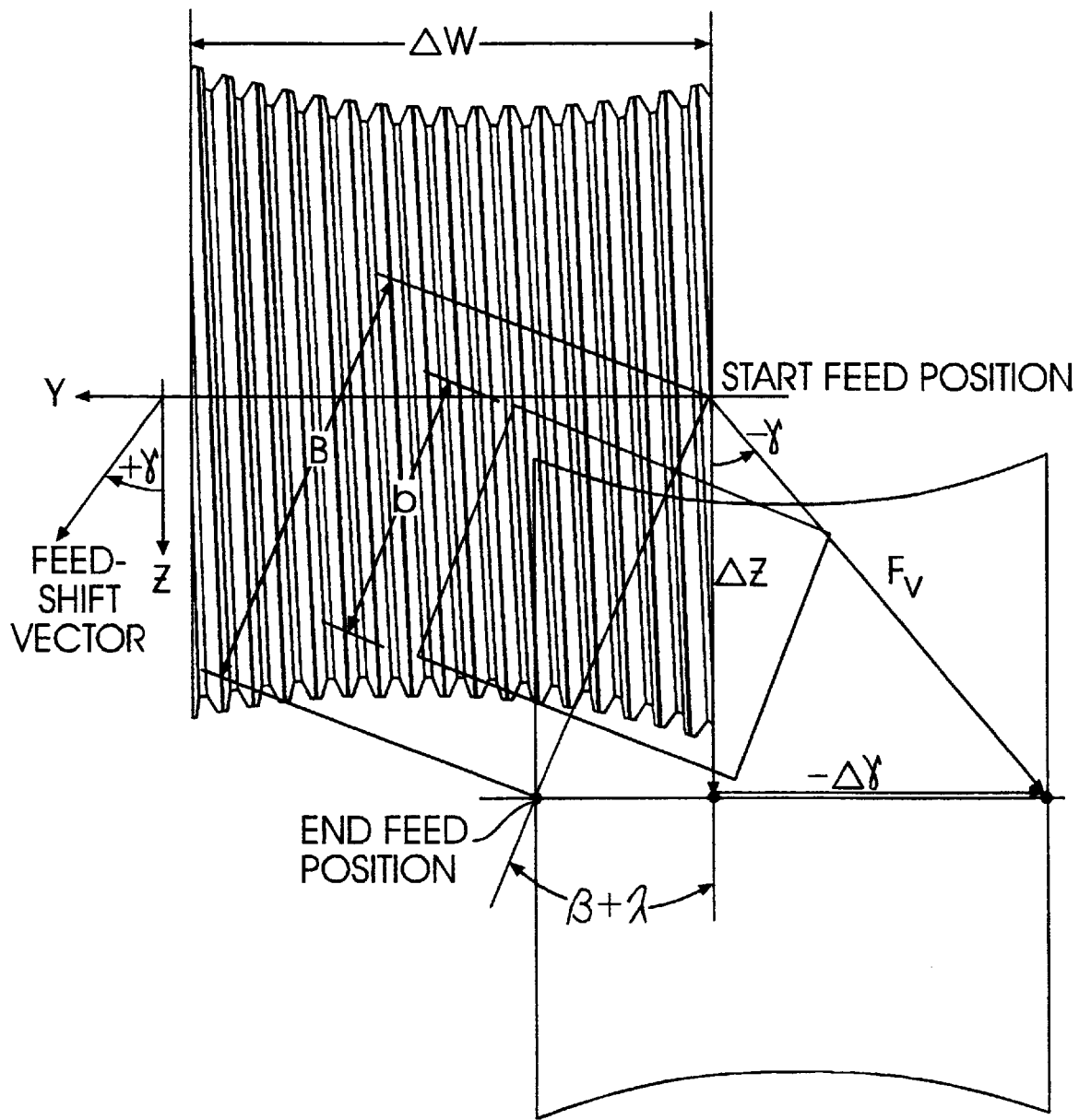
FIG. 11 illustrates shifting of a workpiece across a threaded grinding wheel dressed in accordance with the present invention.

In the grinding process, FIG. 11 illustrates the feed motion of a workpiece across a hollow-crowned grinding wheel The feed vector $F_v$ is shown with feed shift angle γ, which is defined relative to the machine vertical axis (Z-axis). In the example of a machine tool with kinematic configuration as per FIG. 3, the feed shift vector orientation is readily obtained as follows:

$$\gamma = \arctan\left[\frac{\Delta Y}{\Delta Z}\right] = \arctan\left[\tan(\beta + \lambda) \pm \frac{\Delta W}{B * \cos(\beta + \lambda)}\right] \quad (7)$$

where γ=feed shift angle
ΔY=machine shift (Y-axis) travel to grind the gear
ΔZ=total stroke travel to grind the gear
ΔW=desired total wheel shift amount
B=total stroke travel in the workpiece axis direction
b=face width of workpiece
β=helix angle
λ=wheel lead angle As will be apparent to those skilled in the art, the first term in the brackets of Equation (7) is required to maintain the machining zone at a given axial position on the grinding wheel throughout the stroke motion, where the crossed axis angle between workpiece and tool may deviate from 90 degrees. This term thus dictates the feed vector direction for a purely axial feed (i.e. ΔW=0). The second term is the wheel shift component specifically related to tooth twist compensation. The sign of this term depends on the helix hand of the gear and whether the wheel has hollow- or barrel-crowned shape.

Equation (7) has been explained on the basis of a machine with a vertically oriented stroke axis on the work column, as per the common grinding machine design shown in FIG. 3. In this configuration, the axes defining the feed vector coincide with the machine shift (Y-axis) and stroke (Z-axis) directions. However, it should be realized that the feed shift vector can be resolved into motion components corresponding to any other machine design, where the shift and/or stroke motions are carried out by axes oriented differently than in FIG. 3.

Compared to the conventional case with straight rack generating tool, the radial infeed (X-axis) position of a circular arc crowned grinding wheel must be adjusted relative to the workpiece axis as the tool is moved diagonally according to feed vector $F_v$. Namely, the curvature in the tool must be properly considered in order to produce a gear with the desired lengthwise crowning. This becomes simply a matter of determining a modified radial infeed motion (coordinated X- and Z-axis motion) for lengthwise crowning, which, when combined with the effect of the hollow-crown wheel curvature and wheel shift, produce the desired lengthwise crowning.

Explanation of the practical application of the present invention has thus far centered around typical threaded wheel grinding machines, where tool wear is normally of paramount concern. Logical application of the inventive twist modification method therefore takes the form of Equation (2), where the user calculates the required wheel crown radius from the desired twist compensation amount and the selected (normally maximum available) tool width for shifting. It may be more advantageous in some cases, however, to allow the tool shift amount to vary as a function of the selected wheel crown radius and twist compensation amount. Equations (5) and (6) could be rearranged according to and it can be appreciated by the artisan that:

$$\Delta W = f(\Delta \alpha_{comp}, R_b) \quad (8)$$

This approach would be most sensible, for example, if the process should be constrained to a certain wheel radius due to dresser control limitations, or if a twist correction should be produced with a fixed crown radius non-dressable tool that was designed for a different twist correction amount. In these cases, however, full tool utilization would not be possible.

Yet another strategy for tool design according to the present invention could be as follows: if required for machine tool accuracy reasons, it is possible to determine the wheel crown radius and wheel shift amount, such that no radial infeed (X-axis) motion is required during grinding to achieve the desired twist modification and lengthwise crowning on the gear. The useful width of the tool will limit the obtainable crowning amount under these conditions. Since cylindrical gears are generally insensitive to the radial infeed axis reversal associated with lengthwise crowning, at least on modern machine tools capable of using the inventive method, this strategy would only rarely have practical application.

Regardless of method to pick the wheel crown radius and wheel shift amount for a given tooth twist modification, the present invention allows also for small constant pressure angle adjustments along the complete tooth length. In this case a shift offset may be calculated from the center of the wheel crown to effect a constant gear pressure angle change, which may be superimposed on the desired twist compensation. This may be done by dressing the wheel with circular arc centered at half the tool length, and then offsetting the shift motion during grinding. Alternatively, the circular arc center may be offset relative to the wheel center during dressing, and then wheel shift during grinding is carried out relative to the wheel center.

Selection of hollow crowned (concave) vs. barrel crown shape (convex) allows control over the direction of twist modification and the direction of the feed shift vector. For example, in a threaded wheel grinding machine, such as that in FIG. 3, the choice of feed vector direction significantly influences the total amount of machine shift axis (Y-axis) travel required to perform the desired twist modification. With this knowledge therefore, hollow crowned grinding wheels are best used to produce twist compensation to counter that which occurs naturally on either left or right hand helical gears. Barrel crowning would be selected to provide twist modification which adds to the naturally occurring twist. Such a scheme allows implementation of the desired twist compensation while at the same time taking maximum advantage of the available machine shift axis (Y-axis) travel.

The logic may be different for a typical hobbing machine, where the swivel axis is found on the tool side of the machine. In this case the cutting forces, which act in a different workpiece rotational direction between left and right hand helical gears, may play a dominating roll in process quality. It may therefore be desirable to select the feed vector direction depending on machine swivel angle, such that, in order to reduce the amount of naturally occurring twist, a hollow crown tool shape would be used for right hand helical gears, while a barrel crown tool would be used for left hand parts. The rules would be reversed to add to the naturally occurring tooth twist.

If a workpiece has different sections, such as straight angled and curved (crowned) portions, then the grinding wheel shift has to be coordinated with the length of stroke along the face width of the workpiece. In this case, the grinding wheel has corresponding sections which may be curved (circular arc) and straight.

It should be realized that the inventive twist modification method is also applicable where non-circular tooth lengthwise crowning is desired. This can be achieved by replacing the $\Delta Y$ component of the feed shift vector Equation (7) with an appropriate function of the stroke travel distance $\Delta Z$. For example, a first order function of $\Delta Z$ may be used to produced a third order crowning function, a second order function of $\Delta Z$ may be used to produce a fourth order crowning function, and so on. Thus:

$$\gamma = \arctan\left[\frac{\Delta Y}{\Delta Z}\right]$$

$\Delta Y = f(\Delta Z) = a + b^* \Delta Z$ produces third order crowning,
$\Delta Y = f(\Delta Z) = a + b^* \Delta Z + c^* \Delta Z^2$ produces fourth order crowning.

As previously mentioned, the present inventive method may be applied to remove some or all of the natural flank twist on helical gears with lengthwise crowning. Alternatively, it may be used to add to the natural twist on helical gears with crowning. It may also be used to create flank twist on gears that would normally have negligible twist, such as helical gears with no lengthwise crowning or spur gears with or without lengthwise crowning.

Although the above method has been discussed with respect to a threaded grinding wheel, the same principles apply equally to hobbing tools having cutting surfaces helically arranged about the body of the hob. Furthermore, is should also be understood that the principles of the present invention apply also to non-dressable grinding wheels in that the grinding wheel may be formed to include one or more circular arc portions and thread flanks of constant pressure angles and size.

While the invention has been described with reference to preferred embodiments, it is to be understood that the invention is not limited to the particulars thereof. The present invention is intended to include modifications, which would be apparent to those skilled in the art to which the subject matter pertains without deviating from the spirit and scope of the appended claims.

What is claimed is:

1. A grinding wheel for grinding toothed articles, said grinding wheel comprising an axis of rotation, a length extending in the direction of said axis of rotation, and at least one grinding thread having two flank surfaces with said grinding thread being generally helically arranged about said grinding wheel and extending along said length, said grinding wheel further comprising:

one or more axial portions of said grinding wheel along said length having the form of a circular arc when viewed in an axial plane, said two flank surfaces of said grinding thread each having a respective constant pressure angle along said length, said grinding thread being a constant size, with respect to thickness at the pitch point, along said length.

2. The grinding wheel of claim 1 wherein the respective constant pressure angles of each flank surface are equal to one another.

3. The grinding wheel of claim 1 wherein the circular arc form is concave or convex.

4. The grinding wheel of claim 1 being a dressable grinding wheel.

5. The grinding wheel of claim 1 being a non-dressable grinding wheel.

6. A method of grinding spur and helical gears to control flank twist in said gears, said method comprising:

provideing a grinding wheel comprising an axis of rotation, a length extending in the direction of said axis of rotation, and at least one grinding thread having two flank surfaces with said grinding thread being generally helically arranged about said grinding wheel and extending along said length, said grinding wheel further comprising one or more axial portions of said grinding wheel along said length having the form of a circular arc when viewed in an axial plane, said two flank surfaces of said grinding thread each having a respective constant pressure angle along said length, said grinding thread being a constant size, with respect to thickness at the pitch point, along said length, traversing said gear relatively across at least one circular arc portion of said grinding wheel along a feed vector $F_v$, said feed vector being oriented in a predetermined direction diagonally with respect to said axis of rotation.

7. The method of claim 6 wherein said circular arc is calculated as a function of a desired tooth twist modification amount and a desired utilization length of said grinding wheel.

8. The method of claim 6 further including controlling the relative distance between said gear and said grinding wheel during said traversing across said circular arc.

9. The method of claim 6 wherein during said traversing, the mid-point of said circular arc along said axis coincides with the mid-point of the teeth of said gear along the length of said teeth.

10. The method of claim 6 wherein during said traversing, the mid-point of said circular arc along said axis is offset with respect to the mid-point of the teeth of said gear along the length of said teeth.

11. A method of dressing a threaded grinding wheel for enabling subsequent grinding operations to control flank twist in spur and helical gears, said method comprising:

providing at least one dressing tool, providing a grinding wheel comprising an axis of rotation, a length extending in the direction of said axis of rotation, and at least one grinding thread having two flank surfaces with said grinding thread being generally helically arranged about said grinding wheel and extending along said length, traversing said dressing tool in an axial plane across the grinding wheel, said dressing tool following a predetermined circular arc path during at least a portion of said traversing, whereby said dressing results in one or more axial portions of said grinding wheel along said length having the form of a circular arc when viewed in said axial plane, said two flank surfaces of said grinding thread each having a respective constant pressure angle along said length, said grinding thread being a constant size, with respect to thickness at the pitch point, along said length.

* * * * *